United States Patent [19]

Biez

[11] Patent Number: 5,118,336
[45] Date of Patent: Jun. 2, 1992

[54] PROCESS FOR VALORIZING LIQUID MANURE FROM PIGS AND DEVICE FOR IMPLEMENTING SUCH METHODS

[75] Inventor: Georges Biez, Debarieux, France
[73] Assignee: Ecolise, Montpellier, France
[21] Appl. No.: 460,134
[22] PCT Filed: Sep. 29, 1989
[86] PCT No.: PCT/FR89/00503
§ 371 Date: Jun. 25, 1990
§ 102(e) Date: Jun. 25, 1990
[87] PCT Pub. No.: WO90/03351
PCT Pub. Date: Apr. 5, 1990

[30] Foreign Application Priority Data

Sep. 30, 1988 [EP] European Pat. Off. ...... 88402473.8

[51] Int. Cl.$^5$ .................................................. C05F 3/00
[52] U.S. Cl. .................................................. 71/6; 71/9; 71/21
[58] Field of Search .................. 71/1, 11, 6–10, 71/21

[56] References Cited

U.S. PATENT DOCUMENTS

| | | | |
|---|---|---|---|
| 2,750,269 | 6/1956 | Klein | 71/21 |
| 3,905,796 | 9/1975 | Ghelfi | 228/246 |
| 4,088,796 | 5/1978 | Persson | 426/641 |
| 4,198,211 | 4/1980 | Shattock | 71/8 X |
| 4,565,552 | 1/1986 | Cotton | 71/9 |

FOREIGN PATENT DOCUMENTS

| | | | |
|---|---|---|---|
| 0004397 | 10/1979 | European Pat. Off. . | |
| 0341736 | 11/1989 | European Pat. Off. | 71/6 |
| 1438491 | 6/1962 | United Kingdom . | |

OTHER PUBLICATIONS

Chemical Abstracts 99:50098c, pub. Aug. 1983.
Chemical Abstracts 90:91855e, pub. 1978.
Chemical Abstracts 83:26880a, pub. Feb. 1975.
American type culture collection, "Catalogue of Strains", 15th Edition, 1982.

Primary Examiner—Ferris Lander
Attorney, Agent, or Firm—Poms, Smith, Lande & Rose

[57] ABSTRACT

The present invention relates to a method for valorizing liquid manure from pigs by elaboration of biological amendments, said method comprising the fermentation of a biomass based on a mixture of pig liquid manure and a carbonaceous medium. Said biomass is seeded by a bacterial selection comprising Serratia and Klabsiella also relates to a device for implementing such method.

13 Claims, 1 Drawing Sheet

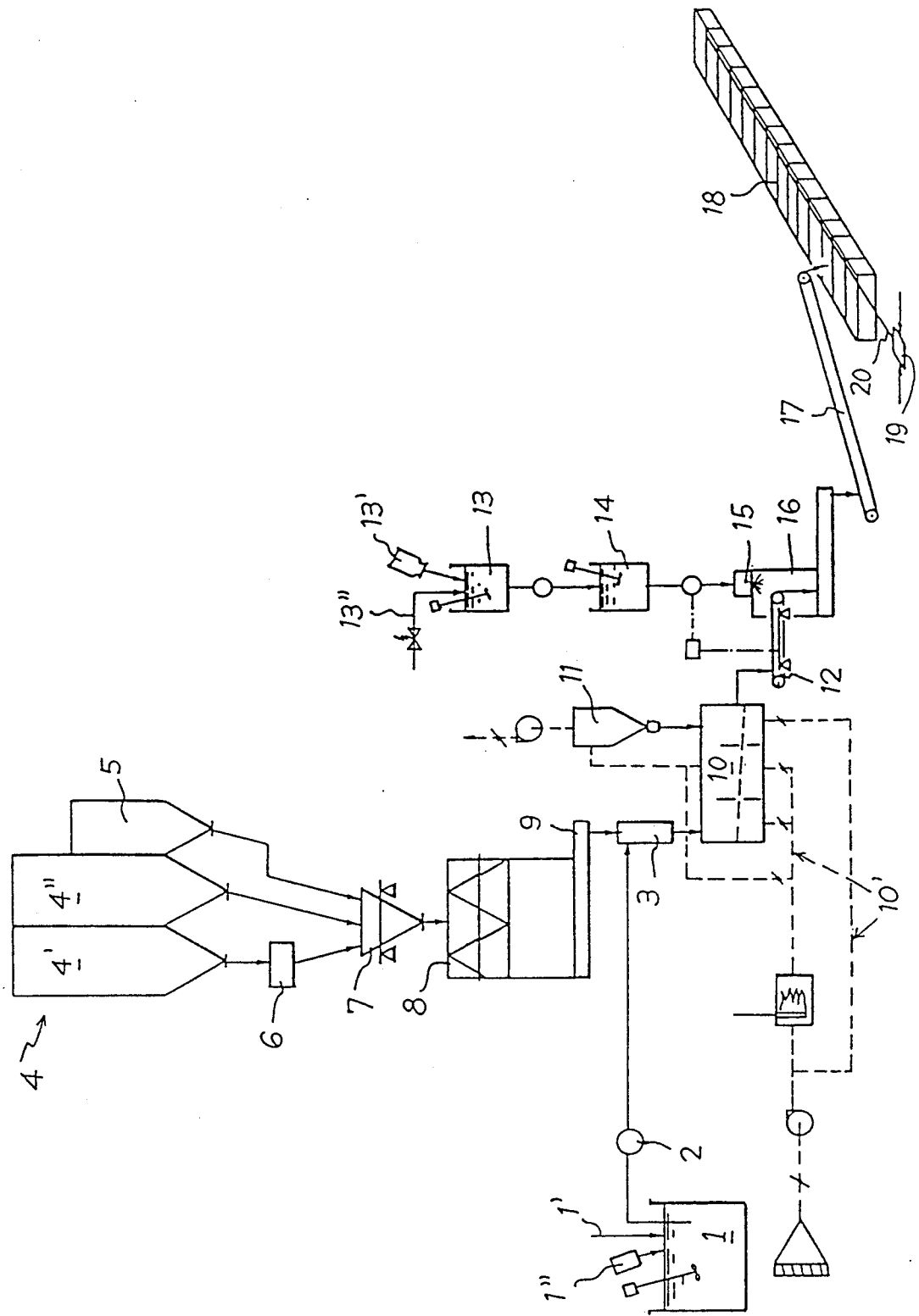

PROCESS FOR VALORIZING LIQUID MANURE FROM PIGS AND DEVICE FOR IMPLEMENTING SUCH METHODS

The present invention has for its object a process for valorizing liquid pig manure and a device for carrying it out.

The process according to the invention allows, from said liquid pig manure, the elaboration of biological improvements, usable in agriculture.

Liquid pig manure is, per se, a very rich fertilizer.

However, its use, crude—application as such or after atomization—is not without danger for the earth and groundwater tables.

In fact, liquid pig manures contain, on the one hand, pathogenic bacteria and, on the other hand, polluting substances such as nitrites, nitrates, copper . . . In addition, they disengage a most unpleasant odour.

According to the invention, a process is proposed which makes it possible, on the one hand, to neutralize the detrimental effects of the liquid manure set forth hereinabove, and, on the other hand, to valorize it by transforming it into a compost able to be used like any organic compost.

Such transformation may be carried out, according to the invention, in a surprizingly short time.

Such results are obtained by the fermentation of a biomass based on a mixture of liquid pig manure and a carbon-containing support under particular conditions.

The process according to the invention employs for the fermentation a specific bacterial selection. It is advantageously carried out to ensure optimal working conditions for the bacteria of this selection.

According to the invention, the biomass—liquid manure + carbon-containing support—is seeded by a bacterial selection including Serratia and Flebsiella.

These bacteria belong to the family of Enterobacteriaceae, they are 100% Gram$^-$.

They were chosen for their intrinsic properties, but have proved—combined—of surprizingly high-performance, both at the level of the course of the process of the invention, and at the level of the use of the product obtained by this process.

It is question of reversible bacteria, capable of working both in an aerobic medium and in an anaerobic medium. They attack the organic matter and are in particular capable of reducing the nitrates into gaseous nitrogen.

In addition, they present a thermal resistance which allows them to be used towards 70° C.

The biomass, treated in accordance with the process of the invention, must be subjected to such temperatures (up to 72° C.) in order, on the one hand, to remove the pathogenic bacteria from the liquid manure and, on the other hand, to start the process of humification of at least a part of the carbon-containing support.

According to the invention, this pair of bacteria has therefore been selected.

They are available on the market. They may act, in accordance with variants of the invention, in combination with others, but prove to be of sufficiently high performance by themselves.

They advantageously act in equal quantities.

The biomass to be seeded, according to the process of the invention, is, as specified hereinabove, based on a mixture of liquid pig manure and a carbon-containing support.

The manure is a liquid, disengaging a sickening smell and generally comprising from 12 to 15% of dry matter.

According to a preferred variant of the process of the invention, it is placed in suspension before being mixed with the carbon-containing support. A colloidal is employed for flocculation thereof.

This colloidal or flocculant ensures suspension of the solid particles and imprisons, traps, retains the odour.

It may be selected for example from among the alginates, carboxymethylcellulose, beer yeast, rice starch, Indian corn starch, . . .

A natural colloidal will advantageously be chosen, which will constitute a reserve of nourishment for the bacteria, upon use thereof (awakening) in the soils.

Burst Indian corn starch is preferred since it is question of a natural colloidal, relatively inexpensive and which acts at ambient temperature.

The use of non-burst corn starch would involve heating the liquid manure towards 40°-45° C.

The liquid manure, advantageously flocculated —which is then in the form of a slimy liquid whose odour has virtually disappeared—is mixed before seeding with a carbon-containing support.

The mixture contains from 55 to 65% by weight of liquid manure—with 12-15% dry matter—for 35 to 45% by weight of carbon-containing support.

The carbon-containing support is generally based on straw. Any type of straw may be used: straw proper, Indian corn straw, hay, even tree branches, . . .

Said carbon-containing support may consist solely of said straw. It may also consist of a mixture of straw and green wood sawdust, for example.

The mixture—liquid manure, carbon-containing support - may constitute the raw material—biomass —necessary for carrying out the process of the invention. However, for the elaboration of high-performance biological improvements, other raw materials ensuring a supply of mineral substances, in A-P-K, will advantageously be employed in the process of the invention.

According to the invention, these other raw materials, which ensure in particular the addition of phosphates, potash, are used before seeding. In this way, said raw materials will be integrated, fixed by the bacteria to the carbon-containing support, particularly the straw. The work of said bacteria renders these materials non-leachable.

These raw materials, incorporated before seeding, must, however, not hinder the work of the bacteria, particularly by modifying the pH of the medium. This is why only natural products are used in the process according to the invention.

Such products advantageously consist of:
fine building plaster (A): said plaster is polyvalent. It acts both at the level of manufacture of the improvement and at the level of its use in the soils. It performs functions of binding, slow-release, . . . It also contributes to the imprisonment of the odour of the liquid manure;
calcined natural phosphate (P);
natural potash (K);
calcium carbonate, preferably with magnesium.

In this way, according to a preferred variant of the invention, fine building plaster, calcined natural phosphate, natural potash, and calcium carbonate, preferably with magnesium are distributed within the carbon-containing support, before its mixture with the liquid manure: these four products being used in equal quantities, their total quantity representing from 10 to 25% by weight of the liquid manure/carbon-containing support mixture.

According to another variant, these four products may be added to the liquid manure/carbon-containing support mixture previously made.

The biomass thus obtaine—liquid manure carbon-containing support + possibly mineral substances—is, according to the invention, subjected to a heat treatment before its seeding. It is taken to about 70° C.

Such heat treatment ensures concentration of the liquid manure, the partial drying of the biomass before its seeding and begins to destroy the pathogenic bacteria that it contains.

The rate of humidity of the biomass obtained must be close to 40%—38 to 43%.

Such a humidity rate of the biomass allows, in the course of fermentation, optimum work of the bacteria.

The biomass is seeded with Serratia and Klebsiella in aqueous solution, by pulverization.

The lyophilized bacteria are on supports, for example at a rate of 6.6 $10^8$ germs/gram. About 200 to 300 g of such supports are introduced for a ton of biomass with 40% humidity. The use of a greater quantity of bacteria is not detrimental.

In the course of incubation, the temperature of the biomass attains 72° C. The pathogenic bacteria of the liquid manure do not withstand this temperature.

When, in the course of incubation, the biomass redescends in mesophilic phase, it is oxygenated. It is only sequentially oxygenated for a short instant.

Incubation must last for a sufficiently long period to kill all the pathogenic bacteria, to humify somewhat the carbon-containing support. However, it must not create losses of proteins.

The process of the invention allows an interesting biomass to be obtained after 10 to 15 days. After 12 days, it is generally of optimal quality.

This result is particularly surprizing since the elaboration of organic fertilizers generally takes much more time.

The living biomass obtained is advantageously directed, according to the process of the invention, towards a pressure granulator. This treatment makes it possible to deaden the bacteria and to obtain a product which is easier to store and distribute in the earth.

Compression is to be carried out on the biomass at about 15–18% humidity. After 10–15 days of incubation of the biomass at 40% humidity, such a biomass is obtained. By exerting 70 to 80 bars thereon, the expected result is obtained without superfluous heating. In fact, it is suitable not to kill the bacteria by taking the biomass by compression to an excessive temperature.

The biomass is then obtained in the form of granules. Distributed in the soil, these granules disintegrate. The deadened bacteria then awaken and begin to work.

According to the invention, a process is therefore proposed which, from a very pollutant product —liquid pig manure—allows the elaboration of a living improvement, which is rich (presenting a valid N-P-K) and non-leachable.

Said improvement is bereft of harmful microbes, it is also advantageously odour-free.

These results are obtained thanks to the intervention of specific bacteria.

According to another object of the present invention, a device is proposed for carrying out the process described hereinabove.

This device comprises:

mixer, supplied, on the one hand, with flocculated liquid manure and, on the other hand, with carbon-containing support;

a fluidized bed drier, advantageously provided with a device for recovering the fines, for subjecting the mixture—liquid manure, carbon-containing support—to a heat treatment;

an enclosure for pulverization of a solution containing the bacteria on the mixture;

reactors or locations for fermentation provided with an oxygenation device;

a rotary granulating press.

At the level of the mixer, the natural products ensuring supply of phosphate, potash . . . advantageously act.

Such a device allows the process according to the invention to be carried out and therefore a biological improvement, which is rich, odour-free, non-leachable, clean (free of pathogenic bacteria), to be obtained in a very short time.

Other characteristics and advantages of the invention will be more readily understood on reading the following description and with reference to the accompanying single FIGURE, which schematically shows a device for carrying out the process according to the invention.

In the liquid manure tank (1)is prepared a suspension of liquid pig manure. The liquid manure containing between 12 and 15% dry extract is supplied at (1'), and, at (1''), burst Indian corn starch. A suspension of said liquid manure may thus be obtained at ambient temperature.

The carbon-containing support is stored at (4) and, at (5), the supplement of natural substances which it is desired to incorporate in the mixture to be composted. More precisely, straw is stored at (4'), green wood sawdust at (4'') and, at (5), an equal-part mixture of fine building plaster, calcined natural phosphate from Senegal, natural potash (patenkali) and magnesium calcium carbonate.

At (6), the straw is broken up.

At (7) has been schematically shown a weighing hopper allowing elaboration of the mixture: straw, sawdust, natural supplement, more precisely the elaboration of the desired quantity of carbon-containing support enriched with APK.

Said enriched carbon-containing support is, thanks to the supplier (9) introduced in the vertical mixer (3) to be mixed with the flocculated liquid manure, itself supplied via pump (2).

By way of example, it may be indicated that 600 l of liquid manure placed in suspension by addition therein of 3 kg of burst Indian corn starch, are mixed with:

400 kg of carbon-containing support constituted by about 320 kg of straw (80%) and 80 kg of green wood sawdust (20%); and 200 kg of supply of APK.

The homogeneous mixture obtained is directed towards a fluidized bed drier (10). At (10') is schematically shown the hot air inlet. Inside the drier (10), 3 temperature zones are distinguished: the first at about 70° C., the second at about 60° C., the third towards 35°–40° C. The parameters of heating are determined so that, on leaving said drier, the final product is at about 40% humidity. In the course of this heat treatment, the liquid manure is concentrated and the pathogenic bacteria that it contains are destroyed. (11) schematically represents a device for recovering the fines; (12), a conveyor belt equipped with a weighing hopper.

The mixture at 40% humidity is seeded in the enclosure (16) for bacterial retention.

The bacterial selection (13') is diluted in water (13") at 33°-35° C. in (13). The bacterial liquid is stored in (14). At (15), its pulverization device has been schematically shown.

The intervening quantities are specified by way of example: 250 g of lyophilized bacteria with their support, diluted in 5 l of water, are provided for a mass of one ton (1000 kg of product at 40% humidity). On said support (sawdust+proteins) are found about $6.6 \cdot 10^8$ germs/gram.

The seeded mixture is directed at (17) towards reactors or windrows (18) (longitudinal pile having a width of about 1 m and a height of 80 cm).

These reactors or windrows (18) are equipped with an oxygenation device (20) supplied at (19) by a mixture of oxygen and air, heated to 35° C.

Oxygenation takes place for a duration of 2 minutes whenever the biomass descends in mesophilic phase (38°-33° C.).

Incubation of the biomass takes place as follows: in about 8 to 9 hours, it rises in thermophilic phase (at an outside temperature of 15° to 18° C., the temperature within the biomass varies between 60° and 72° C.). This thermophilic phase lasts between 48 to 72 hours. The biomass then begins to descend in mesophilic phase and it is then that oxydation takes place.

As soon as oxygenation is finished, the biomass rises in thermophilic phase . . . etc . . .

The duration of incubation of the biomass has been limited to 12 days.

After this time, the biomass—which is living —is directed towards a pressure granulator: rotary granulating press. The bacteria are deadened by compression to about 70-80 bars. Small granules are obtained which may easily be stored and easily distributed in the earth.

The organic fertilizer thus obtained in a very short time (12 to 15 days) from liquid pig manure, has no more odour, contains no more pathogenic bacteria and proves to be of particularly high-performance. In fact, it presents a valid N-P-K, capable of being used at best as said fertilizer is not leachable.

The results of an analysis on the faecal contamination indicator germs and the total microflora, are proposed hereinbelow:

TABLE 1

Analytic results concerning the search for faecal contamination indicator germs and the total microflora

| | Liquid manure | Final product |
|---|---|---|
| Faecal coliforms (E.c.) | $1.65 \cdot 10^8/l$ | not detected |
| Faecal streptococci | $5.5 \cdot 10^8/l$ | $4.8 \cdot 10^3$ |
| Total microflora | $6 \cdot 10^9/l$ | $1.32 \cdot 10^{11}$ |

After only 12 days, all the faecal coliforms disappeared and the density of the faecal streptococci is reduced by a factor 6. This result is remarkable as it allows the powder to be applied after only about fifteen days. The increase in temperature during the fermetation processes is probably the cause of this mortality of the bacteria of the faecal contamination. On the other hand, the total microflora is considerably multiplied thanks to the organic compounds of the mixture attesting the placing of a living biomass.

The organic fertilizer obtained according to the invention may serve for the fertilization of arid soils, for the regeneration of soils exhausted either by intensive crop-growing or by excessive or simply prolonged use of synthetic fertilizers.

What is claimed is:

1. Process for valorizing liquid pig manure by elaboration of biological improvements, said process comprising ther fermentation of a biomass based on a mixture of liquid pig manure and a carbon-containing support, characterized in that said biomass is seeded by a bacterial selection consisting essentially of a mixture of Serratia and Klebsiella in equal quantity, said mixture present in an amount sufficient to provide a thermophilic phase fermentation temperature of between 60° C. and 72° C.

2. Process according to claim 1 characterized in that said biomass is elaborated from a mixture of the liquid manure placed in suspension by addition therein of a natural flocculent and the carbon-containing support.

3. Process according to claim 2, characterized in that burst Indian corn starch is used for placing the liquid manure in suspension.

4. Process according to claim 1 characterized in that said mixture contains from 55 to 65% by weight of a liquid manure with 12-15% of dry matter, placed in suspension, and from 35 to 45% by weight of carbon-containing support.

5. Process according to claim 1 characterized in that the carbon-containing support is based on straw.

6. Process according to claim 1 characterized in that the biomass contains, in addition to the liquid manure and the carbon-containing support, natural products ensuring a supply of mineral substances.

7. Process according to claim 6, characterized in that there is distributed within said carbon-containing support, before it is mixed with the liquid manure, a material selected from the group consisting of fine building plaster, calcined natural phosphate, natural potash and calcium carbonate with or without, preferably with magnesium, in equal quantities, the whole representing from 10 to 25% by weight of the liquid manure—carbon-containing support mixture.

8. Process according to claim 1 characterized in that seeding is effected by pulverization of an aqueous solution containing the bacteria, on the biomass with about 40% humidity.

9. Process according to claim 1 characterized in that, before its seeding, the biomass is subjected to a heat treatment, at around 70° C., to lower its rate of humidity to about 40%.

10. Process according to claim 9 characterized in that, during its heat treatment, the biomass is sequentially oxygenated.

11. Process according to claim 9 characterized in that after heat treatment, said biomass is granulated under pressure.

12. The process according to claim 1, characterized in that said amount of Serratia and Klebsiella is an amount sufficient to raise the temperature of said biomass to about 70° C.

13. Process according to claim 5 characterized in that the straw is in admixture with green wood sawdust.

* * * * *